United States Patent
Buibas et al.

(10) Patent No.: US 10,621,472 B1
(45) Date of Patent: Apr. 14, 2020

(54) RAPID ONBOARDING SYSTEM FOR VISUAL ITEM CLASSIFICATION

(71) Applicant: ACCEL ROBOTICS CORPORATION, San Diego, CA (US)

(72) Inventors: Marius Buibas, San Diego, CA (US); John Quinn, San Diego, CA (US); Tanuj Pankaj, San Diego, CA (US); Chin-Chang Kuo, San Diego, CA (US)

(73) Assignee: ACCEL ROBOTICS CORPORATION, San Diego, CA (US)

( * ) Notice: Subject to any disclaimer, the term of this patent is extended or adjusted under 35 U.S.C. 154(b) by 0 days.

(21) Appl. No.: 16/667,794

(22) Filed: Oct. 29, 2019

(51) Int. Cl.
| | |
|---|---|
| G06K 9/62 | (2006.01) |
| G06K 9/38 | (2006.01) |
| G06T 3/40 | (2006.01) |
| G06T 3/00 | (2006.01) |
| G06K 9/46 | (2006.01) |

(52) U.S. Cl.
CPC ............ G06K 9/6257 (2013.01); G06K 9/38 (2013.01); G06K 9/4661 (2013.01); G06T 3/0056 (2013.01); G06T 3/40 (2013.01)

(58) Field of Classification Search
None
See application file for complete search history.

(56) References Cited

U.S. PATENT DOCUMENTS

| | | | |
|---|---|---|---|
| 5,016,035 A * | 5/1991 | Myles, Jr. ............... | G03B 17/40 396/2 |
| 9,367,770 B2 | 6/2016 | Footen | |
| 9,727,838 B2 | 8/2017 | Campbell | |
| 9,779,546 B2 * | 10/2017 | Hunt ........................ | G06T 17/20 |
| 2005/0195216 A1 * | 9/2005 | Kramer ..................... | G06F 3/14 345/619 |
| 2006/0064308 A1 * | 3/2006 | Foehr ..................... | G06Q 30/06 705/26.1 |
| 2006/0114356 A1 * | 6/2006 | Didow ................... | G03B 15/07 348/587 |
| 2008/0027817 A1 * | 1/2008 | Iizaka .................. | G06Q 20/201 705/20 |

(Continued)

*Primary Examiner* — Kevin Ky

(74) *Attorney, Agent, or Firm* — ARC IP Law, PC; Joseph J. Mayo (57) ABSTRACT

System that facilitates rapid onboarding of an autonomous (cashier-less) store by capturing images of items in the store's catalog from different angles, with varying backgrounds and lighting conditions, and that automatically builds a classifier training dataset from these images. The system may have cameras in different positions, lights supporting variable illumination, and monitor screens that generate different background colors. It may have an input device such as a barcode reader, and an operator terminal that prompts operators to place items into the imaging system in the necessary orientations. Once an item is placed in the imaging system, a fully automated process may generate a sequence of background colors, a sequence of lighting conditions, and may capture and process images from all of the cameras to create training images. Training images for an item may be generated in seconds, compared to many minutes per item using manual image capture and processing.

18 Claims, 8 Drawing Sheets

(6 of 8 Drawing Sheet(s) Filed in Color)

(56) References Cited

U.S. PATENT DOCUMENTS

| | | | |
|---|---|---|---|
| 2008/0166111 A1* | 7/2008 | Didow | G03B 15/07 396/3 |
| 2010/0150403 A1* | 6/2010 | Cavallaro | G08B 21/0476 382/107 |
| 2010/0150536 A1* | 6/2010 | Ryckman | G03B 15/06 396/2 |
| 2011/0140380 A1* | 6/2011 | Ulrich | B62B 5/0096 280/33.992 |
| 2011/0211819 A1* | 9/2011 | Reno | G03B 15/02 396/2 |
| 2012/0011540 A1* | 1/2012 | Pulford | G06Q 30/0251 725/32 |
| 2012/0206558 A1* | 8/2012 | Setton | H04N 7/147 348/14.03 |
| 2012/0206560 A1* | 8/2012 | Setton | H04N 7/147 348/14.08 |
| 2013/0141513 A1* | 6/2013 | Setton | H04L 51/00 348/14.01 |
| 2013/0141515 A1* | 6/2013 | Setton | H04N 7/147 348/14.03 |
| 2013/0176481 A1* | 7/2013 | Holmes | H04N 5/2354 348/370 |
| 2013/0283154 A1* | 10/2013 | Sasakura | G06F 40/106 715/253 |
| 2014/0002677 A1* | 1/2014 | Schinker | H04N 5/232 348/207.1 |
| 2014/0009475 A1* | 1/2014 | Setton | G06T 13/80 345/473 |
| 2014/0152507 A1* | 6/2014 | McAllister | G06K 7/10376 342/126 |
| 2014/0176565 A1* | 6/2014 | Adeyoola | G06T 19/006 345/473 |
| 2014/0244494 A1* | 8/2014 | Davis | G06Q 20/227 705/41 |
| 2014/0244495 A1* | 8/2014 | Davis | G06Q 20/227 705/41 |
| 2014/0244514 A1* | 8/2014 | Rodriguez | G06Q 20/10 705/71 |
| 2014/0258110 A1* | 9/2014 | Davis | G06Q 30/0611 705/41 |
| 2015/0104162 A1* | 4/2015 | Crasnianski | G03B 15/07 396/2 |
| 2015/0227922 A1* | 8/2015 | Filler | G06Q 20/367 705/41 |
| 2015/0304554 A1* | 10/2015 | Matsubara | H04N 5/23222 348/239 |
| 2016/0040982 A1* | 2/2016 | Li | G01B 11/026 356/603 |
| 2017/0011606 A1* | 1/2017 | Ceccon | G07G 1/0045 |
| 2017/0053506 A1* | 2/2017 | Alexis | G08B 13/2434 |
| 2017/0083884 A1* | 3/2017 | Vilmosh | G06K 9/6202 |
| 2017/0103515 A1* | 4/2017 | Hulth | G06K 17/0022 |
| 2018/0234627 A1* | 8/2018 | Kim | H04N 5/247 |
| 2018/0240092 A1* | 8/2018 | Miyagi | G06Q 20/18 |
| 2018/0288300 A1* | 10/2018 | Crooks | H04N 7/181 |

\* cited by examiner

RAPID ONBOARDING SYSTEM FOR VISUAL ITEM CLASSIFICATION

BACKGROUND OF THE INVENTION

Field of the Invention

One or more embodiments of the invention are related to the fields of image analysis, artificial intelligence, and automation. More particularly, but not by way of limitation, one or more embodiments of the invention enable a system that supports rapid onboarding of items, for example for an autonomous store that uses visual item classification to identify items selected by shoppers.

Description of the Related Art

Autonomous stores that allow shoppers to select items and checkout without a cashier are becoming more popular. Some autonomous stores use cameras to identify the items that shoppers select from product shelves based on the items' visual appearance. For example, camera images may be input into a classifier that is trained to recognize items available in the store. Product classification requires the collection of sets of images for the products in different orientations and lighting conditions. Once images are labeled with the corresponding product, they are fed into training algorithms that modify the classifier parameters (usually a neural network, modifying weights) to maximize accuracy. There are many algorithms for training and classification, but all require a representative data set of what the product will look like in an environment where it will be observed.

This "onboarding" process to set up the item images for a store can be extremely time-consuming, particularly for stores with thousands of items and high item turnover as packaging for items changes over time and new items introduced. A typical workflow used in the art for this onboarding process is to manually capture images of each product from various angles and under various conditions. Further manual processing is typically required to crop and prepare item images for a training dataset. The process to onboard a single item may take 15 to 30 minutes. For stores with large numbers of items, onboarding the store's complete catalog may take multiple months, at which time many of the product's packaging may have changed. There are no known systems that automate the onboarding process so that multiple item images can be captured and prepared quickly and with minimal labor.

For at least the limitations described above there is a need for a rapid onboarding system for visual item classification.

BRIEF SUMMARY OF THE INVENTION

One or more embodiments described in the specification are related to rapid onboarding system for visual item classification. An item classifier, which inputs an image and outputs the identify of an item in the image, is trained with a training dataset that is based on images captured and processed by the rapid onboarding system. The system may capture multiple images of each item from different angles, with different backgrounds, as provided by a monitor screen positioned in the background of the images, and under different lighting conditions to form a robust training dataset.

One or more embodiments of the system may include an item imaging system and an item classifier training system. Each of the items that are to be classified (for example, products in an autonomous store) is placed into the item imaging system. An item identification input, such as a barcode scanner or a camera that captures a barcode image, may obtain the item's identifier. The imaging system may contain multiple cameras in different positions that capture images of the item from different angles. Embodiments utilize one or more monitor screens that display various background colors in the captured images. This enables capturing multiple images rapidly with different backgrounds, i.e., without moving the item and placing it on a different background. For example, the background colors may include at least two colors with different hues that are utilized when capturing different images in rapid fashion. Specifically, a controller of the item imaging system transmits commands to the monitors to successively display different background colors, and commands the cameras to capture images with these background colors. The captured images and the item identifier are transmitted to the item classifier training system. The training system may generate a training dataset based on the images, where each training image is labeled with the item identifier. The training system then trains an item classifier with the training dataset.

A monitor screen may for example be at or near the bottom of the item imaging system, and the item may be placed onto the monitor screen for image capture. In one or more embodiments, the item imaging system may have a transparent platform onto which the item is placed for image capture, and cameras may be oriented to capture images of both the top side and bottom side of the item, again, without moving the object.

In one or more embodiments, the imaging system may have at least two cameras that are separated horizontally by at least 30 centimeters.

One or more embodiments may have an operator terminal linked to the controller; the terminal may display instructions to place each item into one or more orientations.

In one or more embodiments, the imaging system may also have controllable lights that may output multiple lighting conditions. The lights may be controlled by the system controller, which transmits lighting commands to successively output each lighting condition. An illustrative lighting condition may have some of the lights on and others off. Other embodiments may alter the color or diffusion characteristics of the lights.

The controller may command the monitor screen or screens to output a sequence of background colors, and command the cameras to capture a set of first images with each background color. Then it may command the lights to output a sequence of lighting conditions, and command the cameras to capture a set of second images with each lighting condition. The two sets of images may then be processed to generate training images for each item.

An illustrative process to generate training images first extracts an item mask from the set of first images (with different background colors), and then applies this mask to the set of second images (with different lighting conditions) to separate the item (in the foreground) from the background. Mask extraction may for example use a difference of the hue channels of two (or more) images with different background colors; the item mask may be based on a region in the hue difference with values below a threshold value. The item foreground images from the set of second images may then be modified using various transformations to form the training images for the item. Illustrative modifications may include for example scaling, rotation, color changes, adding occlusions, and placing the item into different backgrounds.

In one or more embodiments, the visual item classifier may have two stages: an initial feature extraction stage that maps images into feature vectors, and a classification stage that maps feature vectors into item identities. The training dataset may be used to train only the classification stage; the feature extraction stage may be a fixed mapping, for example based on a publicly available image recognition network.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other aspects, features and advantages of the invention will be more apparent from the following more particular description thereof, presented in conjunction with the following drawings wherein.

DETAILED DESCRIPTION OF THE INVENTION

A rapid onboarding system for visual item classification will now be described. Embodiments of the system may for example enable rapid and efficient "onboarding" of an automated store by capturing and processing images of items in the store's inventory in order to train an item classifier that is used to identify items taken by shoppers. In the following exemplary description, numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
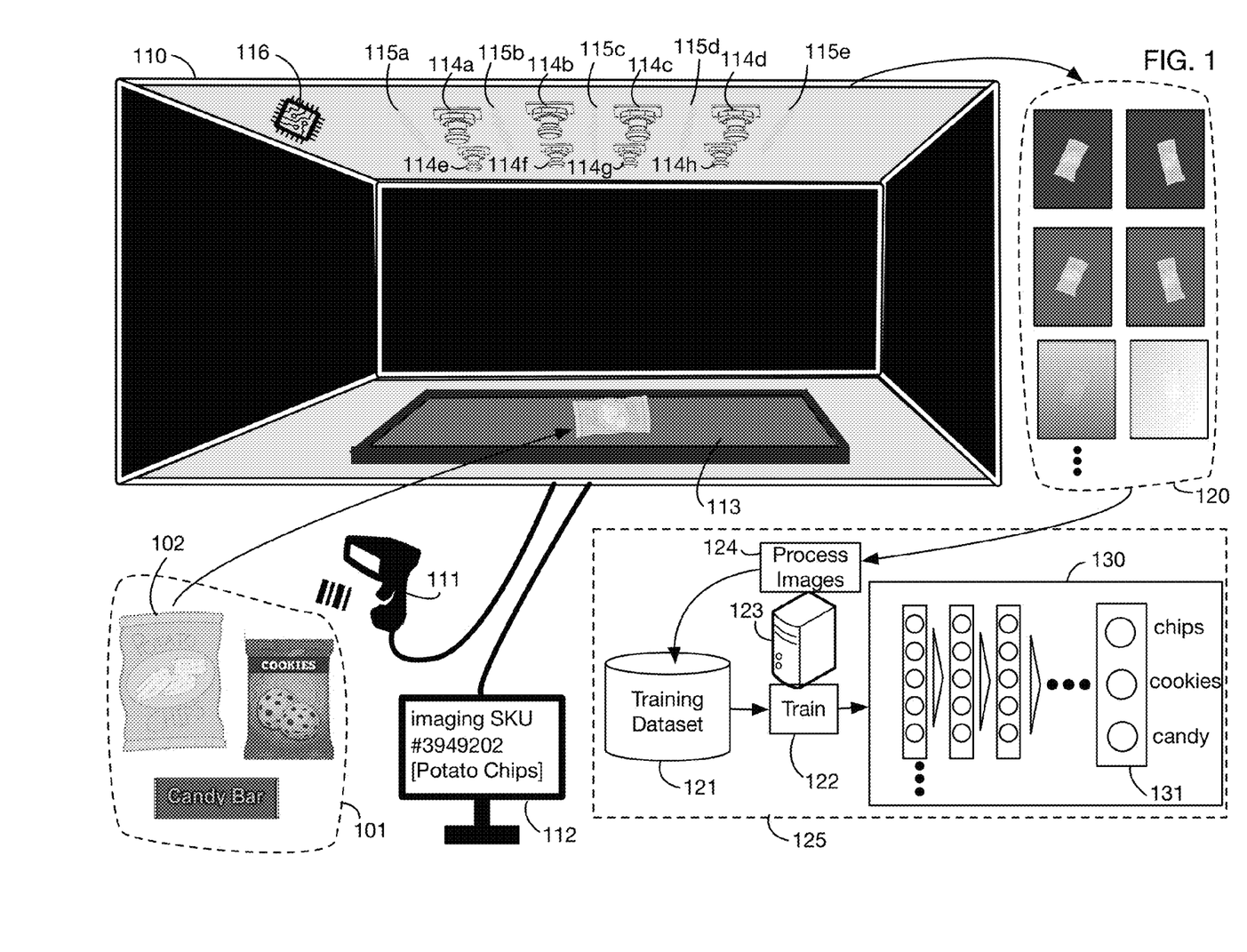
FIG. 1 shows components of an illustrative rapid onboarding system that has a monitor screen onto which a product is placed for imaging, and multiple lights and cameras to capture images from different positions and under different conditions.

FIG. 1 shows an illustrative embodiment of the invention that may be used to capture and process images of three illustrative items 101, which may be offered for sale in an autonomous store. Stores may have thousands of items in their product catalogs, and representative images of every item must be captured to onboard a store for autonomous operation. Multiple images of each item may be needed for example to train a visual item classifier 130 that identifies items selected by shoppers when the store is in operation. Embodiments of the invention may greatly reduce the amount of time needed to capture these images. Each item may be placed successively into the image capture system 110, which controls the imaging environment and manages the image capturing process. In the example of FIG. 1, an operator places item 102 into the system 110. In one or more embodiments, movement of items successively into image capture system 110 may be automated or semi-automated; for example, items may be placed onto a conveyor belt or a rotating platform that moves items into and out of the system 110, or a robotic system may successively transport items into and out of the system.

Item 102 is placed into imaging system 110 onto a monitor screen 113. A monitor screen may be any device or devices that can generate a background of different colors or patterns. The image capture system 110 may vary the background colors or patterns of screen 113 to facilitate processing of item images, as described below. The monitor screen 113 may be for example, without limitation, a standard computer monitor screen, a television, a projector screen, or an array of LEDs of different colors, wavelengths, or intensities. In the embodiment of FIG. 1, a single monitor screen 113 is placed on the bottom surface of imaging system 110, and the item 102 is placed directly on top of this screen. One or more embodiments may place monitor screens in other locations within imaging system 110, and may place items onto other surfaces rather than directly onto the screen; an illustrative example is described below with respect to FIG. 4.

Before or after item 102 is placed into imaging system 110, the identity of the item is recorded using an item identification input device 111. This input device 111 may be for example a barcode reader that scans a barcode printed on or attached to the item. Device 111 may be a camera that captures an image of the item that includes an image of a barcode or other identifying mark or text; in particular it may be identical to one of the other imaging cameras in the system 110 described below. Device 111 may be a user interface such as a touchscreen, keyboard, terminal, microphone, or other device that a user may use to directly input an item identifier. One or more embodiments of the imaging system 110 may include an attached operator terminal 112, which may in some cases also be the item identification input device 111. The operator terminal may provide information and instructions to an operator to guide the process of placing items into the imaging system 110.

In addition to the monitor screen or screens 113, imaging system 110 may contain cameras and lights. The lights may for example be controllable to provide variable illumination conditions. Item images may be captured under different lighting conditions in order to make the training of the item classifier 130 more robust so that it works in the potentially varying conditions of an operating store. Illustrative lights 115a through 115e are shown mounted at different positions on the lower surface of the ceiling of imaging system 110. One or more embodiments may have any number of lights mounted in any positions and orientations. The lights 115a through 115e may support controllable variable illumination. Variations in illumination may consist of only on/off control, or in one or more embodiments the lights may be controllable for variable brightness, wavelengths, or colors. Variations in illumination may be discrete or continuous.

Imaging system 110 contains cameras 114a through 114h, which in this embodiment are oriented to point downwards at monitor screen 113. One or more embodiments may have any number of cameras mounted in any positions and orientations. Cameras may be in different positions in order to capture images of item 102 from different angles. For example, in an illustrative embodiment, cameras 114a and 114d may be separated by approximately 30 centimeters, and cameras 114a and 114e may be separated by approximately 5 centimeters. In one or more embodiments, cameras may be placed in positions that are similar to the positions of cameras in an operating store, for example on the underside of a shelf looking down on the shelf below, so that captured images reflect the possible images of items during store operations.

Imaging system 110 may contain or may be coupled to a controller 116, which may communicate with and control system components such as identification input device 111, operator terminal 112, monitor screen or screens 113, variable illumination lights 115a through 115e, and cameras 114a through 114h. This controller 116 may contain any type or types of processor, such as for example a microprocessor, microcontroller, or single board computer. In one or more embodiments the controller 116 may be a computer that is physically remote from but coupled to the physical imaging system 110. In one or more embodiments the operator terminal 112 may be a computer that also acts as controller 116. Controller 116 executes a sequence of operations, described below, to change the imaging environment and to capture images 120 of the item.

Images 120 of item 102 captured by cameras 114a through 114h are then used to train the visual item classifier 130 that may be used to recognize items from images captured during store operations. The classifier training system 125 may first process the item images 120 to generate training images of the item. Illustrative steps for image processing operation 124 are illustrated below with respect to FIGS. 6 and 7. Training images of all items 101 are labeled with the item identities as captured by input device 111. The labeled images are added to a training dataset 121. The training dataset is input into a training process 122 that trains the visual item classifier 130. Classifier 130 may for example accept as input an image of an item (as an array of pixel values), and may output a final layer 131 that identifies the item in the image. For example, output layer 131 may assign a probability to each item, and the identified item may be the item with the highest probability. Classifier 130 may be any type of classifier, including for example, without limitation, a neural network, a linear classifier, a support vector machine, or a decision tree. Any machine learning algorithm or algorithms may be used for training process 122.

Training system 125 may include a processor or processors 123, which may for example perform image processing operation 124 and training operation 122. In one or more embodiments, controller processor 116 and training system process 123 may be identical or may share components. Processor or processors 123 may for example include GPUs to parallelize image processing and training operations. In one or more embodiments, processor or processors 123 and training dataset 121 may be remote from item imaging system 110, and images 120 may be transferred over a network connection to the training system 125.

Figure 2:
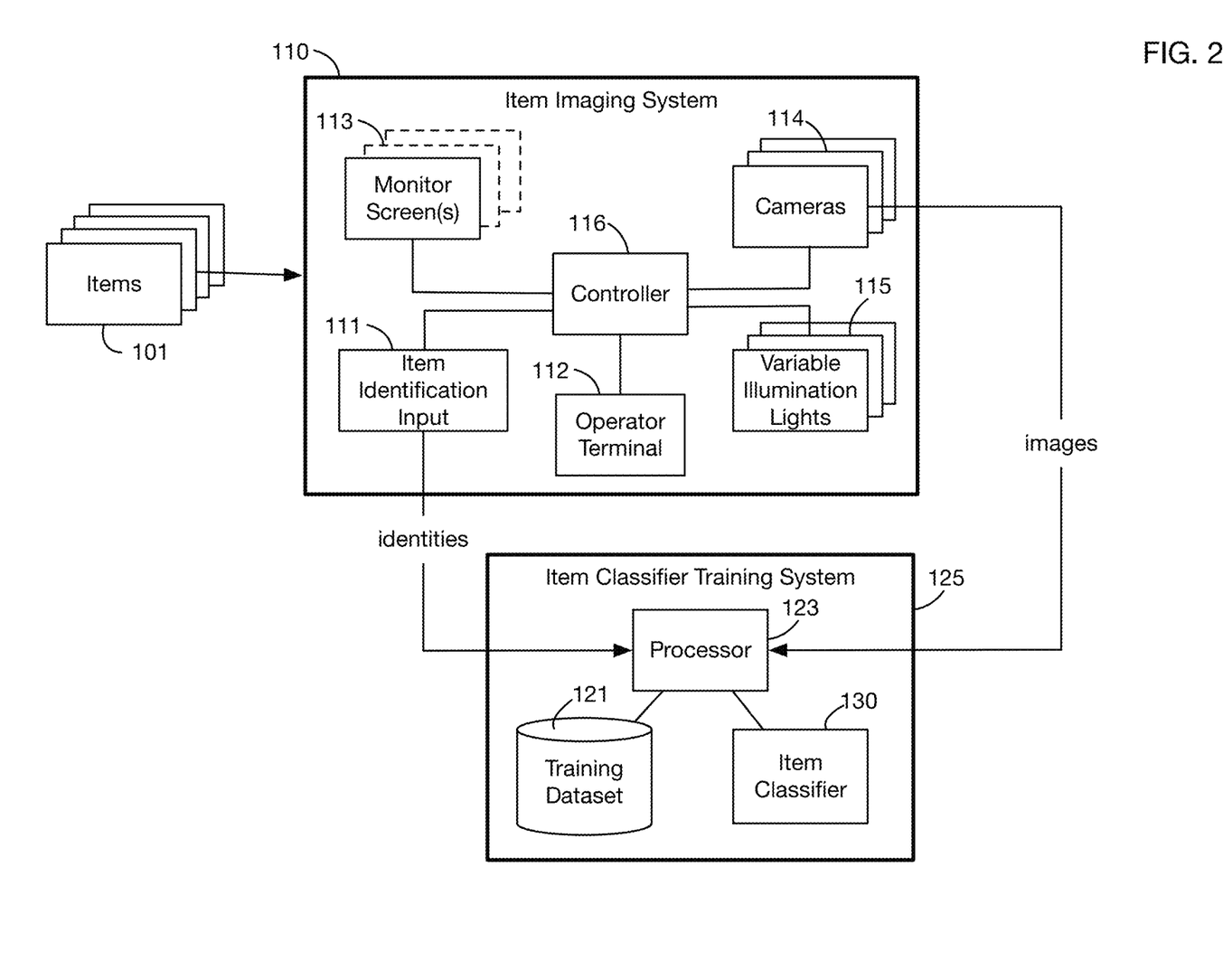
FIG. 2 shows an architectural block diagram of the embodiment of FIG. 1.

FIG. 2 shows an architectural block diagram of the embodiment of FIG. 1. The two major subsystems of the embodiment are item imaging system 110, and item classifier training system 125. Items 101 are placed into item imaging system 110; images and item identities are passed from the item imaging system to the item classifier training system. In item imaging system 110, controller 116 is coupled to and controls all other components, including monitor screen or screens 113, cameras 114, variable illumination lights 115, item identification input 111, and operator terminal 112. Item classifier training system 125 has a processor (or processors) 123, which is connected to training dataset 121 and to item classifier 130; processor 123 processes the images from cameras 114, builds the training dataset 121, and performs the training of the classifier 130. These components are illustrative; one or more embodiments may have different components, a subset of these components, or components organized with different connections.

Figure 3:
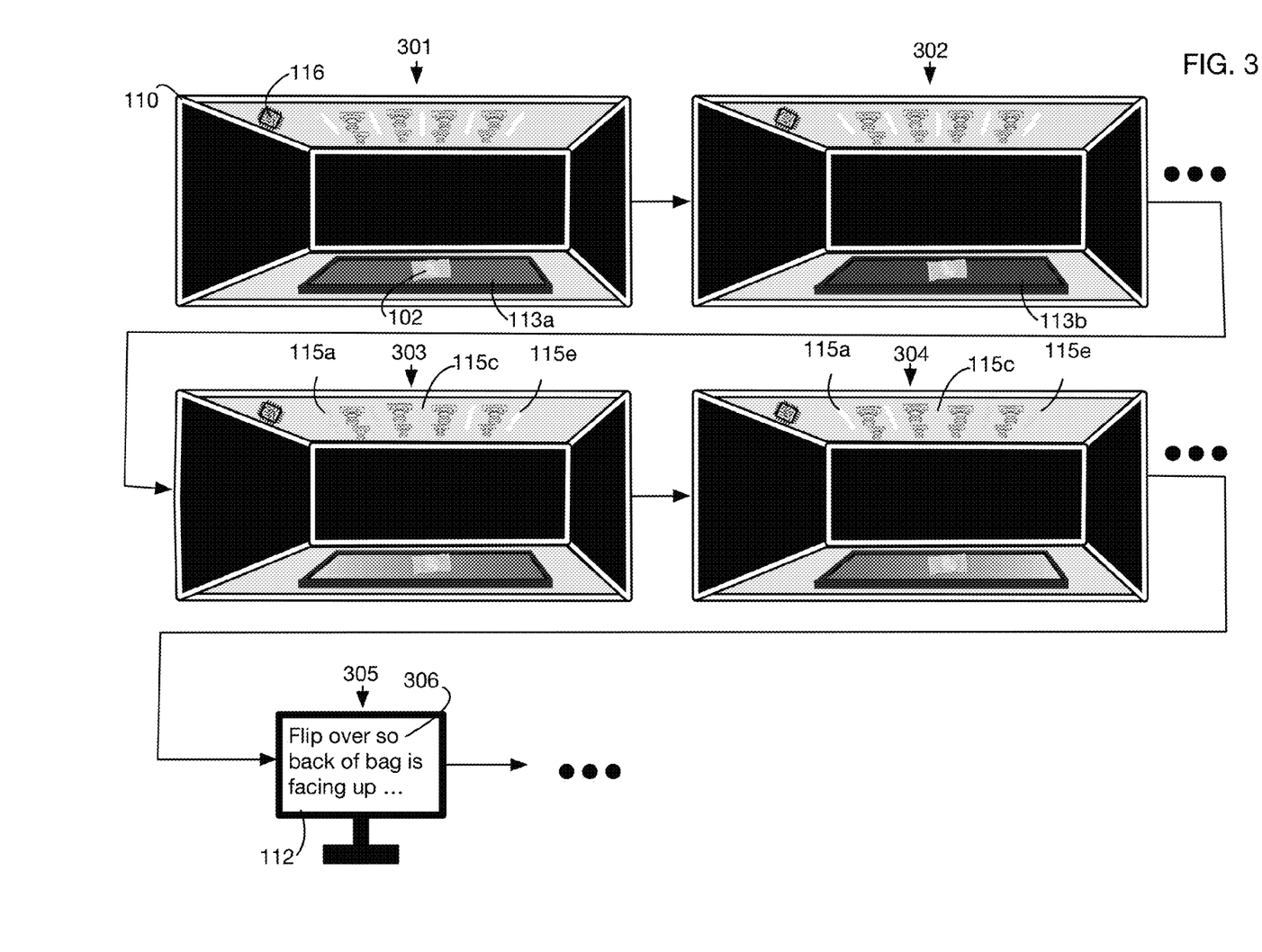
FIG. 3 shows an illustrative sequence of imaging steps employed by the system of FIG. 1: first the monitor background is set to different colors; then the variable illumination lights are set to different lighting conditions; and finally, the item is placed in a different orientation for additional imaging.

FIG. 3 shows an illustrative sequence of steps that may be performed by item imaging system 110 to capture images of item 102. After item 102 is placed onto the monitor screen, controller 116 first cycles the monitor screen through a sequence of background colors, and captures images with each background color. For example, in step 301, the monitor screen background 113a is set to red, and in step 302 the monitor screen background 113b is set to blue. As described below with respect to FIG. 6, modifying the background color (or pattern) allows the system to extract a high-quality mask of the item being imaged. Any number of background colors (or patterns) may be used. After the background sequence (steps 301, 302, and similar steps for other backgrounds), controller 116 then cycles the lights through a sequence of lighting conditions, and captures images with each lighting condition. For example, in step 303, left light 115a is set to high intensity, middle light 115c is dimmed to low intensity, and right light 115e is off; then in step 304, left light 115a is off, middle light 115c is at low intensity, and right light 115e is set to high intensity. Any number of lighting conditions may be used, and each may correspond to any settings of the various lights in the imaging system 110. Finally, after cycling through background colors and lighting conditions (and capturing images for each), in step 305, operator terminal 112 displays message 306 that prompts the operator to put item 102 into a different orientation; the image capture sequences may then be performed again for the new item orientation. An illustrative series of prompts for an item with a shape that is roughly a rectangular parallelepiped may be for example to rotate the item along its long axis so that the upward facing surface of the item is the top, right side, bottom, and left side, and to then rotate the item so that the front end and then back end are facing upward (6 orientations in total). In one or more embodiments, analysis of the images already captured of an item may be used to determine what additional orientations, if any, need to be captured, and prompt or prompts 306 may be set accordingly. Special instructions may also be provided in some situations for how to arrange an item in different configurations for imaging. For example, some product packaging has a flexible protrusion that can be folded over in different orientations, and the appearance of the product may differ depending on how the protrusion is folded; terminal 112 may then instruct the operator to change the fold orientation to capture images in all configurations. Operator terminal 112 may not be needed in some environments, for example if it is obvious which orientations each item should be placed into, or if (as illustrated below) the system is able to capture images of an item from multiple orientations simultaneously.

Figure 4:
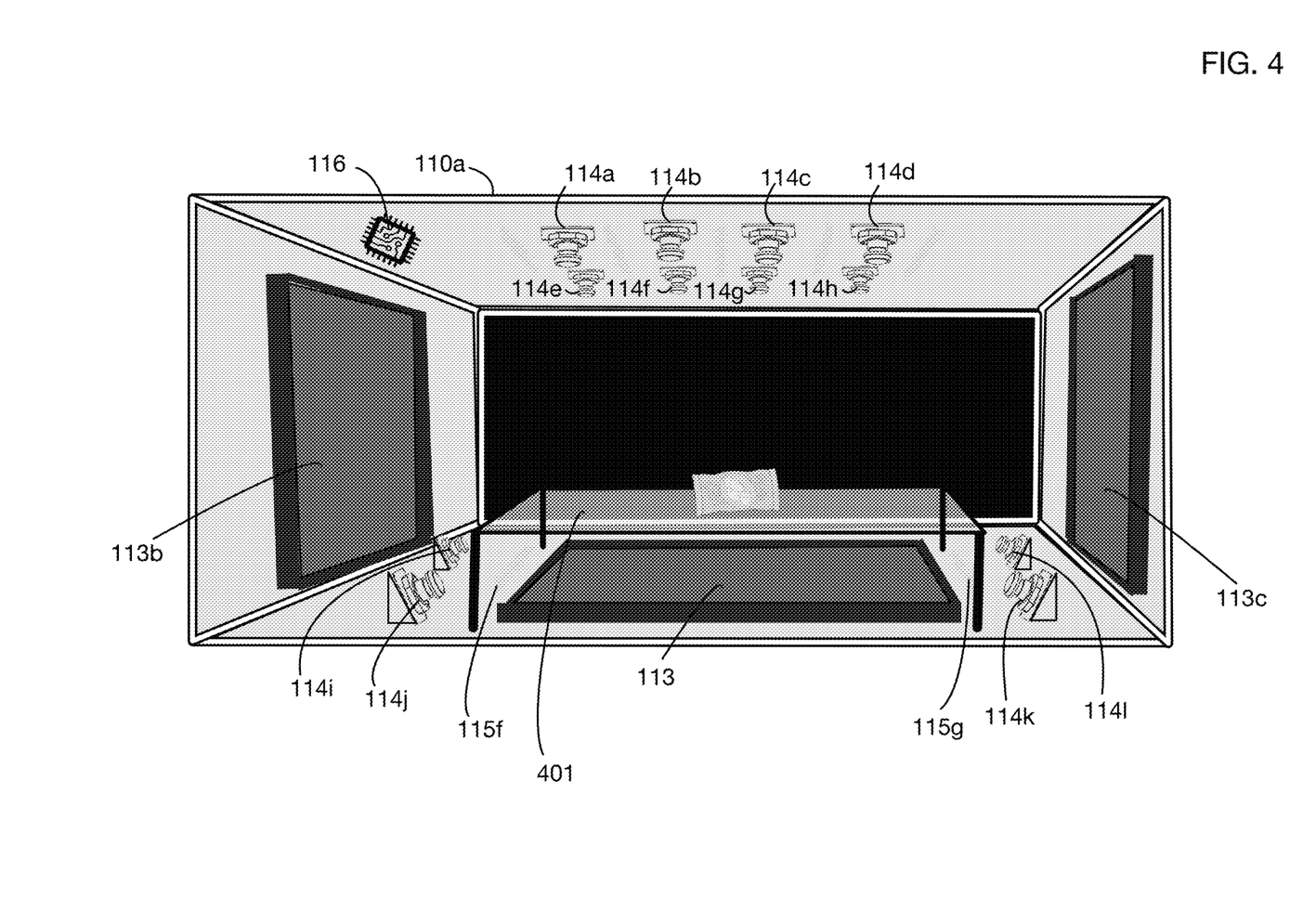
FIG. 4 shows a variation of the embodiment of FIG. 1 with multiple monitor screens on different internal faces of the imaging system, and a transparent pedestal onto which an item is placed for imaging.

FIG. 4 shows a variation 110a of the item imaging system 110 of FIG. 1. In this embodiment, images of both the top and bottom sides of an item may be captured simultaneously. Instead of being placed directly onto a monitor surface, items are placed on a transparent pedestal or platform 401 that fits over the bottom monitor 113. Cameras 114a through 114h are located above the surface of platform 401 and look down at the top side of the item. Additional cameras 114i, 114j, 114k, and 114l are located on the bottom surface of the imaging system, below the surface of platform 401, pointing upwards at the bottom side of the item. Lights 115f and 115g are located on the bottom surface of the imaging system to illuminate the bottom side of the item. Additional monitor screens 113b and 113c are located on the sides of the imaging system, to form controllable backgrounds for the images from cameras 114i through 114l. As in FIG. 1, all components are connected to and controlled by controller 116.

The configuration shown in FIG. 4 is illustrative; one or more embodiments may place monitor screens, cameras, and lights in any locations and orientations, to support image capture from any angles under any desired background and lighting conditions. In one or more embodiments, the transparent platform 401 may be a one-way mirror so that cameras may be placed directly underneath the platform without interfering with images captured from the cameras above the item.

Figure 5:
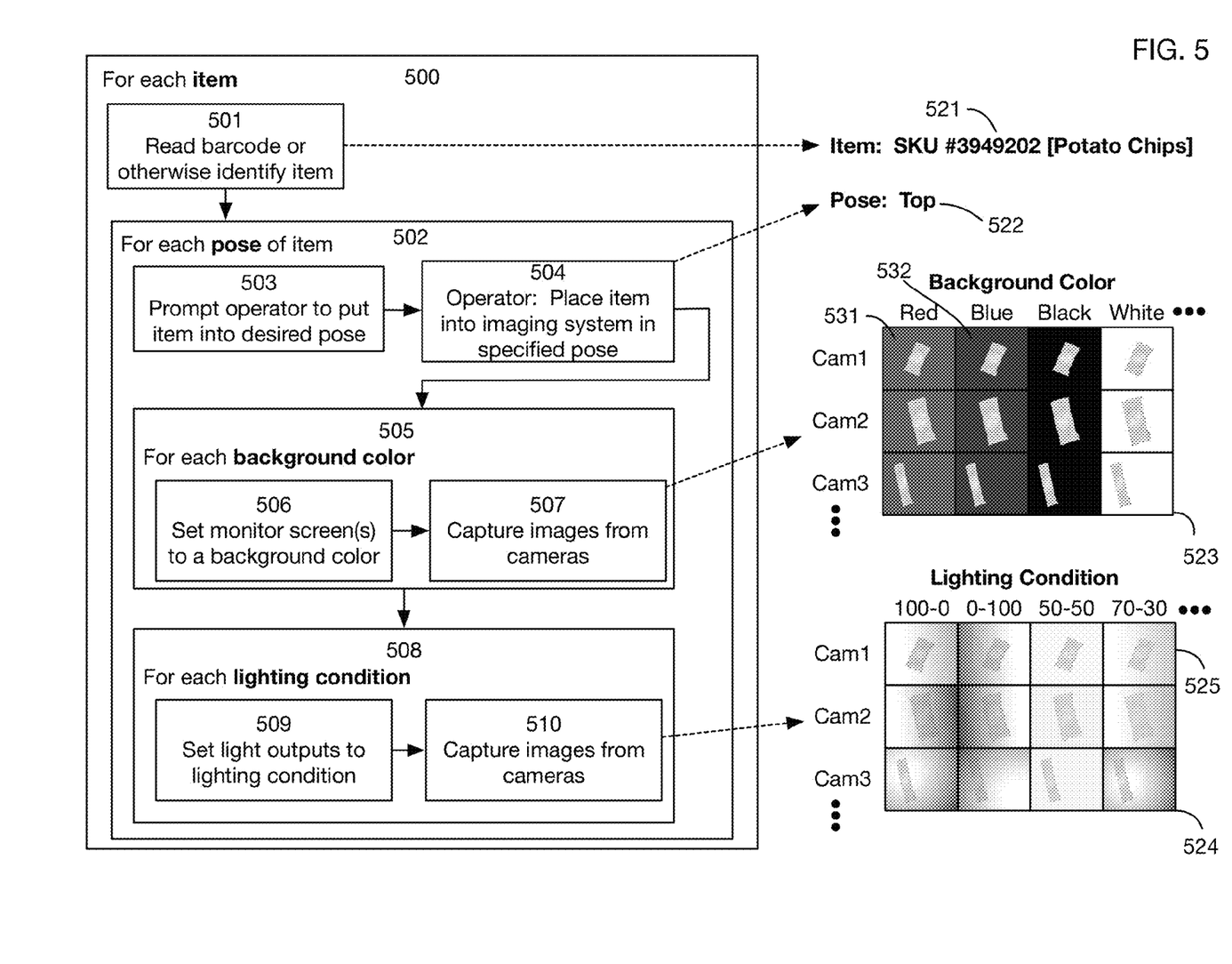
FIG. 5 shows an illustrative flowchart of steps to capture images from the imaging system.

FIG. 5 shows a flowchart of illustrative steps performed by one or more embodiments of the invention to capture item images under different orientations and backgrounds. Outer loop 500 is repeated for each item that needs to be recognized by the item classifier (for example, for all items in a store's catalog or inventory). In step 501, an item barcode or other identifier is read, for example by a barcode scanner or camera, which obtains the item identifier 521 (such as a SKU). Then loop 502 is repeated for each different pose into which the item must be placed for imaging. A prompt 503 may be generated to instruct the operator to place the item into the desired pose; the operator may perform step 504 to put the item into the imaging system in this pose 522. Two inner loops are 505 and 508 are then performed to cycle through background colors and lighting conditions, respectively. In inner loop 505, step 506 sets the monitor screen or screens to the desired background color, and step 507 captures images from the cameras with this background. Images captured in this loop 505 may be represented for example as table 523, which has an image for each combination of camera and background color. Illustrative table 523 has images for four different background colors: red, blue, black, and white. One or more embodiments may use any set of any number of background colors, including for example colors of different hues (such as red and blue). Illustrative image 531 is an image from a first camera with a red monitor background, and image 532 is an image from the same camera with a blue monitor background. In inner loop 508, set 509 sets the lights to the desired lighting condition (which may set different lights to different outputs), and step 510 captures images from the cameras with this lighting condition. Images captured in this loop 508 may be represented for example as table 524, which has an image for each combination of camera and lighting condition. For example, row 525 in table 524 contains the images captured from the first camera under the various lighting conditions. The monitor screen background color may be set for example to a neutral color (or turned off entirely) for inner loop 508. In illustrative table 524, lighting conditions are represented by an intensity of "left" lights and "right" lights; in one or more embodiments any combination of light intensities and colors for the entire set of lights may represent a distinct lighting condition.

Figure 6:
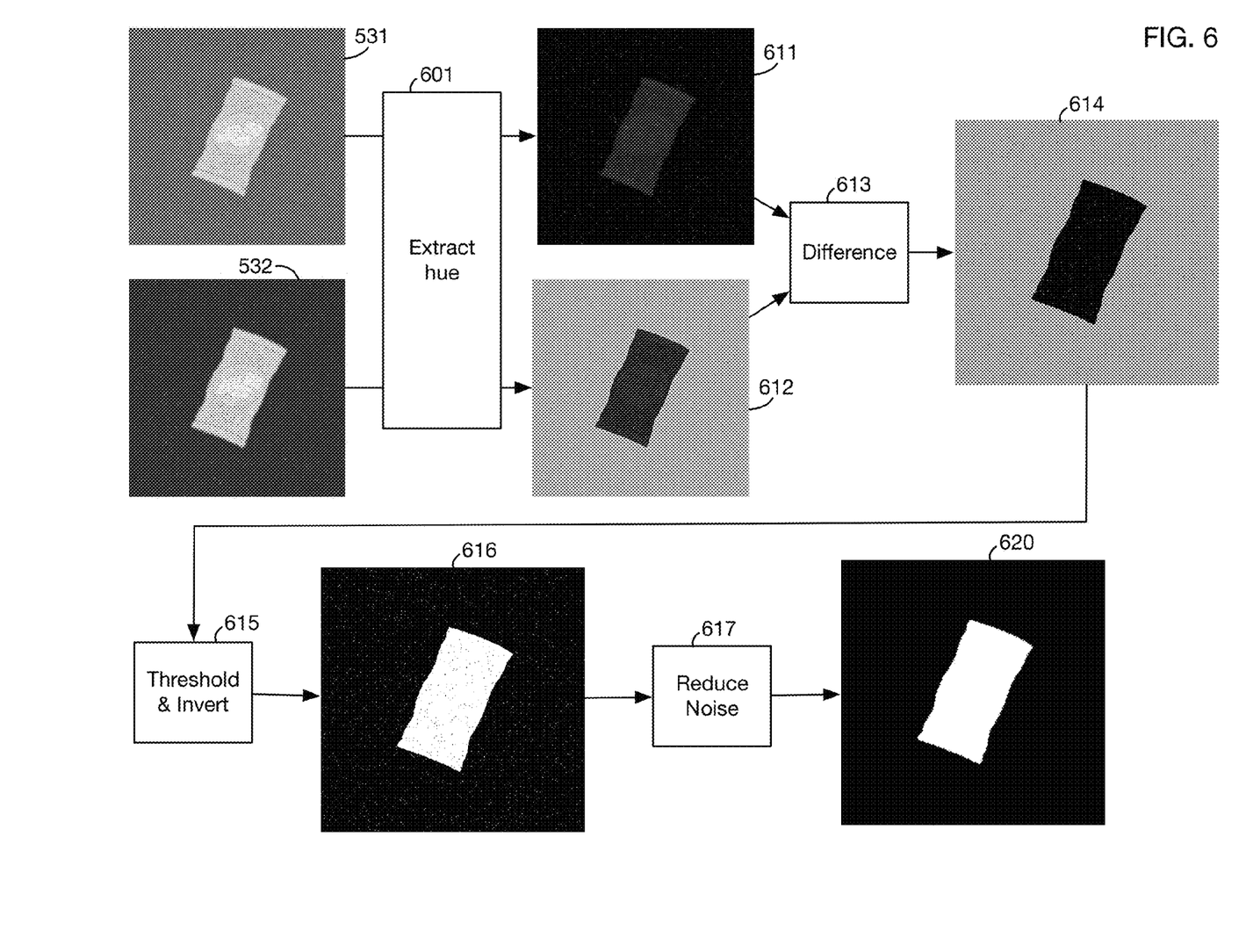
FIG. 6 shows an initial processing step that may be employed on the images captured by the imaging system, which extracts a binary mask of the item for each camera view.
Figure 7:
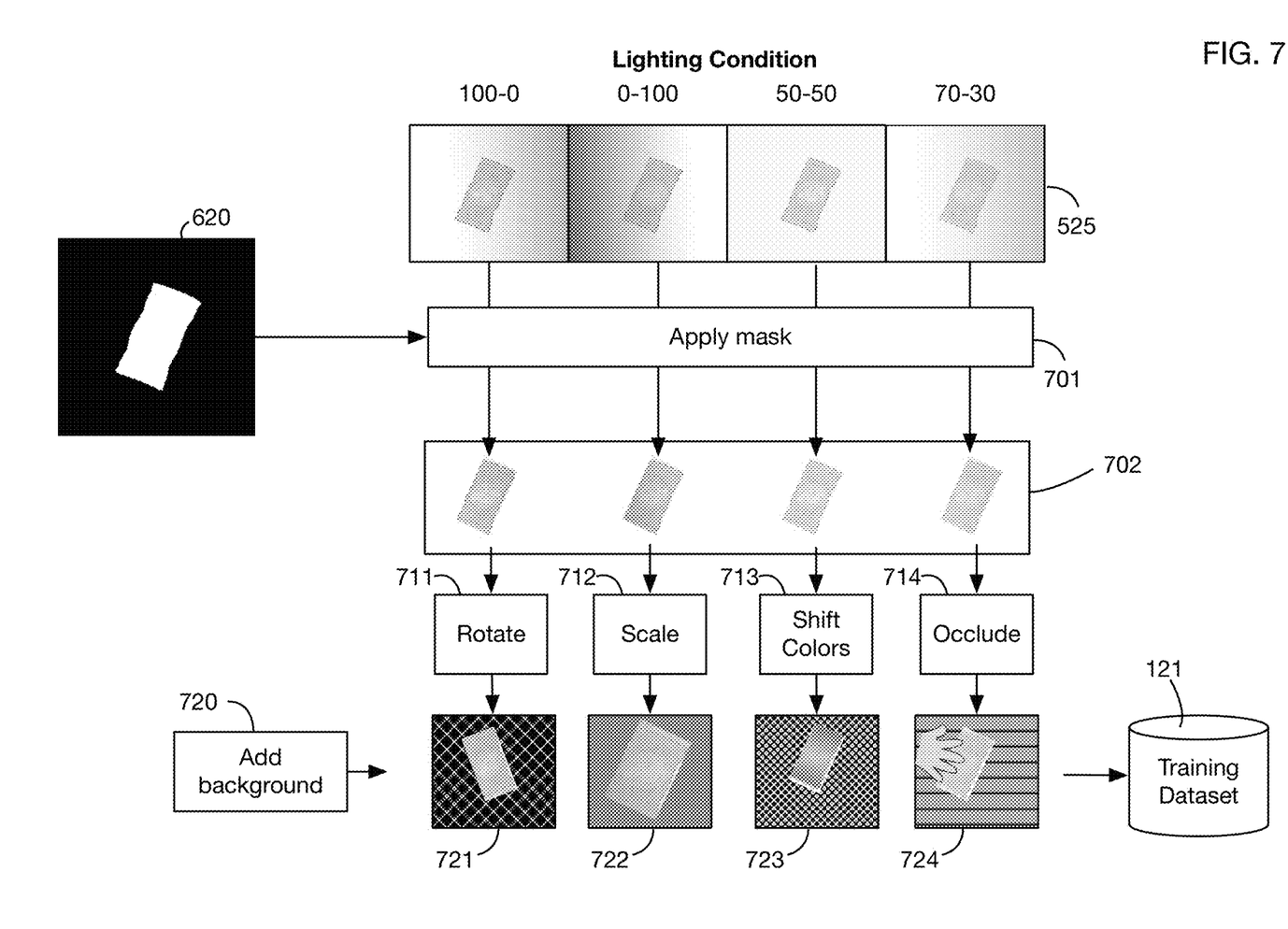
FIG. 7 shows another illustrative processing step that uses the mask from FIG. 6 to extract products from the background, and then generates synthetic images with modifications for the training dataset.

FIGS. 6 and 7 show illustrative steps to implement image processing step 124 that transforms images 523 and 524 into training data for the item classifier. These steps may be performed automatically by one or both of the imaging system controller or by the processor or processors of the training system. An initial processing step, illustrated in FIG. 6, may generate a mask of the item that may be used to separate the item image from the background. Variation of monitor screen background colors (in loop 505 of FIG. 5) facilitates this mask extraction step, since the item in the foreground can be identified as the portion of an image that does not change dramatically when the background color changes. An item mask may be generated for each camera. For example, in FIG. 6, images 531 and 532 corresponding to a first camera with red and blue backgrounds, respectively, may be processed to generate item foreground mask 620. (For simplicity, this process is illustrated using only two images; one or more embodiments may use any number of images with different background colors to calculate an item mask for a camera). In the embodiment shown in FIG. 6, the mask is extracted by locating image areas where the hue of the image remains relatively fixed when the background color changes. Step 601 extracts the hue channel (for example in an HSV color space) from images 531 and 532, yielding images 611 and 612, respectively. Hues are shown as greyscale images, with the red background hue in image 531 corresponding to black (hue of 0), and the blue background hue in image 532 corresponding to a light grey (hue of 240). Differencing operation 613 on the hue channels 611 and 612 results in difference 614; the central black zone shows that the hue of the item foreground is very similar between images 531 and 532. Operation 615 then thresholds difference 614 (converting it to a binary image) and inverts the result, yielding binary image 616. Noise in this image is reduced in step 617 (for example using morphological operators or other filters), resulting in final item mask 620.

The item foreground mask 620 (for each camera) may then be applied to the images 524 captured for each combination of camera and lighting condition. This process is illustrated in FIG. 7 for images 525 from the first camera. In step 701, mask 620 is applied to the images 525, yielding images 702 of the item alone (without a background). In one or more embodiments, these extracted item images 702 may be modified in various ways to generate training images that are added to training dataset 121. For example, any data augmentation techniques commonly applied to image data for machine learning may be applied to images 702. FIG. 7 shows illustrative examples of image rotation 711, scaling 712, color shifting 713, and adding occlusions 714. A background addition step 720 may then be applied to the transformed item foreground images, yielding for example images 721, 722, 723, and 724 that may be added to the training dataset 121 (labeled with the item identifier). Backgrounds may be selected randomly, or they may be selected to match possible backgrounds expected during store operations, such as patterns on store shelves or other items that may be placed on the same shelf.

Figure 8:
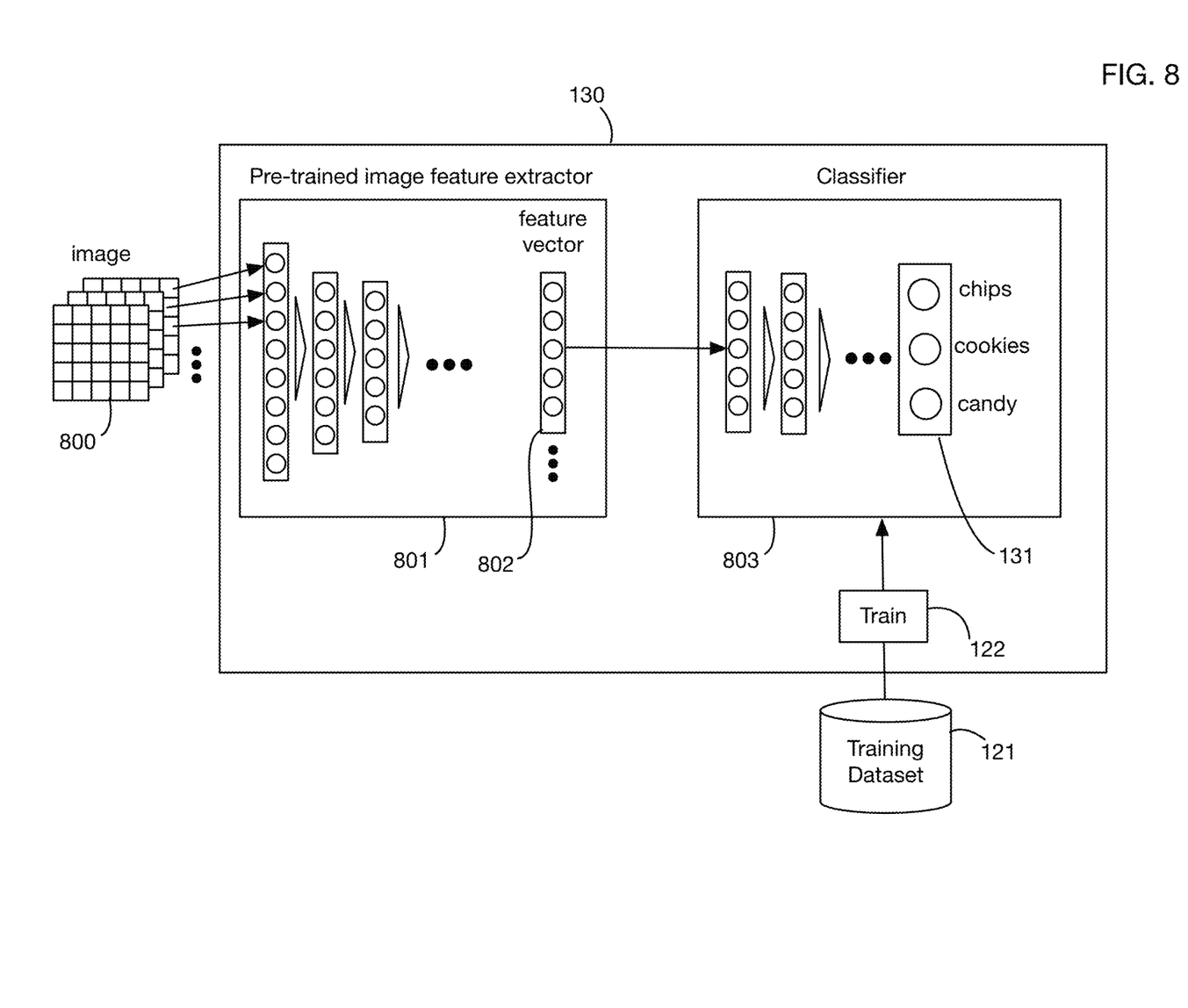
FIG. 8 shows a machine learning architecture that may be used in one or more embodiments, with a pre-trained feature extraction layer feeding a classifier layer that is trained on the training dataset of images generated from the item images captured by the imaging system.

Training dataset 121 containing labeled item images (transformed for example as shown in FIG. 6) may then be used to train the visual item classifier. One or more embodiments may use any type or types of classifier and any type or types of machine learning algorithms to train the classifier. FIG. 8 shows an illustrative architecture that may be used in one or more embodiments. The visual item classification system 130 may be structured in two stages: an initial feature extractor phase 801 that maps images 800 (as pixel arrays) into feature vectors 802, and a classifier phase 803 that classifies images based on the feature vector 802 generated by the first phase 801. The feature extractor 801 may be for example any module that maps image pixels into a feature vector; examples include, without limitation, a neural network, a convolutional neural network, a color histogram vector, a histogram of oriented gradients, a bag of visual words histogram constructed from SURF or other traditional computer vision features, or a concatenation of any of the above. The classifier 803 may be for example, without limitation, a K-nearest neighbor classifier, logistic regression, a support vector machine, a random forest classifier, Adaboosted decision trees, and a neural network which may be for example fully connected.

In one or more embodiments, the feature extractor phase 801 may be pre-trained (for example on a standardized bank of labeled images such as the ImageNet database), and training step 122 on the store's items may be applied only to the classification phase 802. A potential benefit of this approach is that training 122 may be considerably faster, and may require lower computational resources. Another benefit is that retraining may be faster when a store's product catalog is changed, since the feature extractor may not need to change. Feature extractor 801 may be based for example on publicly available image recognition networks such as ResNet or Inception. In one or more embodiments, feature extractor 801 may also be trained on the training dataset 121 if time and resources permit, which may in some situations improve classification accuracy.

While the invention herein disclosed has been described by means of specific embodiments and applications thereof, numerous modifications and variations could be made thereto by those skilled in the art without departing from the scope of the invention set forth in the claims.

What is claimed is:

1. A rapid onboarding system for visual item classification comprising:
   an item imaging system into which each item of a plurality of items is placed, said item imaging system comprising
      an item identification input configured to receive an identifier associated with said each item;
      one or more monitor screens, each configured to display a plurality of background colors;
      a plurality of cameras in different positions, each camera of said plurality of cameras oriented to view said each item and at least a portion of at least one of said one or more monitor screens that is configured to display a plurality of background colors;
      a controller coupled to said plurality of cameras, and to said one or more monitor screens, wherein said controller is configured to
         transmit monitor commands to said one or more monitor screens to successively display each background color of said plurality of background colors;
         command said plurality of cameras to capture images from said each camera of said plurality of cameras;
   an item classifier training system coupled to said item imaging system, comprising a processor configured to
      generate a training dataset based on said images associated with said each camera and with said each item, wherein said training dataset comprises training images of said each item labeled with said identifier of said each item;
      train an item classifier with said training dataset, wherein said item classifier inputs an image and outputs an identity of an item in said image.

2. The system of claim 1, wherein said plurality of background colors comprises two or more different colors, each having a different hue.

3. The system of claim 1, wherein
   said one or more monitor screens comprise a bottom monitor screen located below said each item when said each item is placed in said item imaging system.

4. The system of claim 1, wherein said item imaging system further comprises
   a transparent platform onto which said each item is placed for image capture.

5. The system of claim 4, wherein said plurality of cameras comprises
   at least one camera oriented to view a top side of said each item; and,
   at least one camera oriented to view a bottom side of said each item.

6. The system of claim 1, wherein said plurality of cameras comprises at least two cameras separated horizontally by at least 30 centimeters.

7. The system of claim 1, further comprising
   an operator terminal coupled to said controller and configured to display instructions to place said each item into said item imaging system in one or more orientations.

8. The system of claim 1, wherein said item identification input comprises a barcode scanner configured to read a barcode of said each item.

9. The system of claim 1, wherein said item identification input comprises one or more cameras of said plurality of cameras, wherein said one or more cameras are configured to capture an image of a barcode of said each item.

10. The system of claim 1, wherein said item imaging system further comprises
    one or more variable illumination lights oriented to illuminate said each item, each configured to output a plurality of lighting conditions;
    wherein said controller is coupled to said one or more variable illumination lights and wherein said controller is further configured to transmit lighting commands to said one or more variable illumination lights to successively output each lighting condition of said plurality of lighting conditions.

11. The system of claim 10, wherein said each lighting condition comprises a corresponding set of said one or more variable illumination lights turned on, and the remainder of said one or more variable illumination lights turned off.

12. The system of claim 10, wherein said controller is further configured to capture a set of first images from said each camera of said plurality of cameras, each first image of said set of first images corresponding to said each background color; and, capture a set of second images from said each camera of said plurality of cameras, each second image of said set of second images corresponding to said each lighting condition.

13. The system of claim 12, wherein said generate said training dataset comprises analyze said set of first images associated with said each camera and with said each item to obtain a mask of said each item in said set of first images;

apply said mask of said each item to said set of second images associated with said each camera and with said each item to obtain foreground second images of said each item;

generate said training images of said each item based on said foreground second images of said each item.

14. The system of claim 13, wherein said generate said training images of said each item comprises modify one or more of a scale, a rotation, a color, and an occlusion of said foreground second images to form modified foreground second images; and, add said modified foreground second images to background images to form said training images.

15. The system of claim 13, wherein said analyze said set of first images associated with said each camera and with said each item to obtain said mask comprises calculate a hue difference comprising a difference between a hue channel of a first image of said set of first images corresponding to a first background color, and a hue channel of a second image of said set of first images corresponding to a second background color different from said first background color;

calculate said mask based on a region in said hue difference comprising values below a threshold value.

16. The system of claim 1, wherein said item classifier comprises a feature extraction stage that inputs said image; and a classification stage coupled to said feature extraction stage, wherein said classification stage outputs said identity of said item in said image.

17. The system of claim 16, wherein said feature extraction stage comprises a fixed mapping from said image to a feature vector;

said fixed mapping is not trained using said training dataset; and, said classification stage is trained using said training dataset.

18. A rapid onboarding system for visual item classification comprising:

an item imaging system into which each item of a plurality of items is placed, said item imaging system comprising an item identification input configured to receive an identifier associated with said each item;

an operator terminal configured to display instructions to place said each item into said item imaging system in one or more orientations;

one or more monitor screens, each configured to display a plurality of background colors, wherein said plurality of background colors comprises two or more different colors each having a different hue;

one or more variable illumination lights oriented to illuminate said each item, each configured to output a plurality of lighting conditions;

a plurality of cameras in different positions, each camera of said plurality of cameras oriented to view said each item and at least a portion of at least one of said one or more monitor screens that is configured to display a plurality of background colors;

a controller coupled to said plurality of cameras, to said operator terminal, to said item identification input, to said one or more monitor screens, and to said one or more variable illumination lights, wherein said controller is configured to transmit monitor commands to said one or more monitor screens to successively display each background color of said plurality of background colors;

command said plurality of cameras to capture a set of first images from said each camera of said plurality of cameras, each first image of said set of first images corresponding to said each background color;

transmit lighting commands to said one or more variable illumination lights to successively output each lighting condition of said plurality of lighting conditions; and command said plurality of cameras to capture a set of second images from said each camera of said plurality of cameras, each second image of said set of second images corresponding to said each lighting condition;

an item classifier training system coupled to said item imaging system, comprising an item classifier that inputs an image and outputs an identity of an item in said image, said item classifier comprising a feature extraction stage that inputs said image; and a classification stage coupled to said feature extraction stage, wherein said classification stage outputs said identity of said item in said image;

a processor configured to calculate a hue difference comprising a difference between a hue channel of a first image of said set of first images corresponding to a first background color, and a hue channel of a second image of said set of first images corresponding to a second background color different from said first background color;

calculate a mask based on a region in said hue difference comprising values below a threshold value;

apply said mask to said set of second images associated with said each camera and with said each item to obtain foreground second images of said each item;

modify one or more of a scale, a rotation, a color, and an occlusion of said foreground second images to form modified foreground second images;

add said modified foreground second images to background images to form training images of said each item;

generate a training dataset comprising said training images of said each item labeled with said identifier of said each item; and, train said classification stage with said training dataset.

\* \* \* \* \*